United States Patent
Khan et al.

(10) Patent No.: US 8,811,892 B2
(45) Date of Patent: Aug. 19, 2014

(54) SYSTEMS, METHODS, AND COMPUTER READABLE MEDIA FOR PERFORMING MULTIPLE TRANSACTIONS THROUGH A SINGLE NEAR FIELD COMMUNICATION (NFC) TAP

(75) Inventors: Mohammad Khan, San Jose, CA (US); Philippe Martin, San Jose, CA (US); Jean-Christophe Raynon, San Jose, CA (US); Aron Clark, San Mateo, CA (US)

(73) Assignee: Mastercard International Incorporated, Purchase, NY (US)

( * ) Notice: Subject to any disclaimer, the term of this patent is extended or adjusted under 35 U.S.C. 154(b) by 156 days.

(21) Appl. No.: 13/080,613

(22) Filed: Apr. 5, 2011

(65) Prior Publication Data

US 2011/0244796 A1    Oct. 6, 2011

Related U.S. Application Data

(60) Provisional application No. 61/321,110, filed on Apr. 5, 2010.

(51) Int. Cl.
*H04B 5/00* (2006.01)

(52) U.S. Cl.
USPC .......... 455/41.1; 455/405; 455/406; 235/375; 235/380

(58) Field of Classification Search
USPC ............... 455/41.1, 41.2, 405, 406, 407, 408, 455/414.2, 466, 557; 235/375, 380, 487, 235/492
See application file for complete search history.

(56) References Cited

U.S. PATENT DOCUMENTS

| 4,120,011 A | 10/1978 | Kolb, Jr. |
| 4,575,621 A | 3/1986 | Dreifus |
| 4,701,601 A | 10/1987 | Francini et al. |
| 4,758,714 A | 7/1988 | Carlson et al. |

(Continued)

FOREIGN PATENT DOCUMENTS

| EP | 0 863 477 A1 | 9/1998 |
| EP | 0 949 593 A2 | 10/1999 |

(Continued)

OTHER PUBLICATIONS

Commonly-assigned, co-pending U.S. Appl No. 13/283,521 for "Systems, Method, and Computer Readable Media for Using One or More Preferred Application Lists in a Wireless Device Reader," (Unpublished, filed Oct. 27, 2011).

(Continued)

*Primary Examiner* — Tuan H Nguyen
(74) *Attorney, Agent, or Firm* — Jenkins, Wilson, Taylor & Hunt, P.A.

(57) ABSTRACT

The subject matter described herein includes a method of performing multiple transactions through a single near field communication (NFC) tap. The method includes storing, at a linking application in a wireless device, a plurality of application identifiers (AIDs) that identify a plurality of applications to be processed in a single NFC tap. The method can further include detecting, by a wireless device reader, a linking application AID in the wireless device that identifies the linking application upon interfacing the wireless device with the wireless device reader through the single NFC tap. The method can include accessing, by the wireless device reader, the plurality of AIDs using the linking application. The method can further include processing the plurality of applications associated with the plurality of AIDs through the single NFC tap.

19 Claims, 3 Drawing Sheets

(56) References Cited

U.S. PATENT DOCUMENTS

| | | | |
|---|---|---|---|
| 4,788,420 A | 11/1988 | Chang et al. | |
| 4,973,828 A | 11/1990 | Naruse et al. | |
| 5,157,247 A | 10/1992 | Takahira | |
| 5,266,789 A | 11/1993 | Anglin et al. | |
| 5,276,311 A | 1/1994 | Hennige | |
| 5,530,232 A | 6/1996 | Taylor | |
| 5,590,038 A | 12/1996 | Pitroda | |
| 5,594,233 A | 1/1997 | Kenneth et al. | |
| 5,602,377 A | 2/1997 | Beller et al. | |
| 5,608,193 A | 3/1997 | Almogaibil | |
| 5,679,945 A | 10/1997 | Renner et al. | |
| 5,781,723 A | 7/1998 | Yee et al. | |
| 5,796,828 A | 8/1998 | Tsukamoto et al. | |
| 5,797,470 A | 8/1998 | Bohnert et al. | |
| 5,850,077 A | 12/1998 | Tognazzini | |
| 5,859,419 A | 1/1999 | Wynn | |
| 5,878,141 A | 3/1999 | Daly et al. | |
| 5,917,168 A | 6/1999 | Nakamura et al. | |
| 5,955,961 A | 9/1999 | Wallerstein | |
| 5,991,410 A | 11/1999 | Albert et al. | |
| 6,018,717 A | 1/2000 | Lee et al. | |
| 6,038,491 A | 3/2000 | McGarry et al. | |
| 6,061,665 A | 5/2000 | Bahreman | |
| 6,068,183 A | 5/2000 | Freeman et al. | |
| 6,131,811 A | 10/2000 | Gangi | |
| 6,141,161 A | 10/2000 | Sato et al. | |
| 6,155,484 A | 12/2000 | Sasaki | |
| 6,175,922 B1 | 1/2001 | Wang | |
| 6,181,981 B1 | 1/2001 | Varga et al. | |
| 6,189,791 B1 | 2/2001 | Takita et al. | |
| 6,206,293 B1 | 3/2001 | Gutman et al. | |
| 6,233,448 B1 | 5/2001 | Alperovich et al. | |
| 6,250,557 B1 | 6/2001 | Forslund et al. | |
| 6,293,462 B1 | 9/2001 | Gangi | |
| 6,295,482 B1 | 9/2001 | Tognazzini | |
| 6,446,864 B1 | 9/2002 | Kim et al. | |
| 6,584,309 B1 | 6/2003 | Whigham | |
| 6,637,653 B1 | 10/2003 | Takita et al. | |
| 6,658,248 B1 | 12/2003 | Lee | |
| 6,662,224 B1 | 12/2003 | Angwin et al. | |
| 6,704,567 B1 | 3/2004 | Chapman, Jr. et al. | |
| 6,711,263 B1 | 3/2004 | Nordenstam et al. | |
| 6,769,607 B1 | 8/2004 | Pitroda et al. | |
| 6,808,111 B2 | 10/2004 | Kashef et al. | |
| 6,844,813 B2 | 1/2005 | Hardman | |
| 7,028,897 B2 | 4/2006 | Fernandes et al. | |
| 7,051,932 B2 | 5/2006 | Fernandes et al. | |
| 7,127,236 B2 | 10/2006 | Khan et al. | |
| 7,494,055 B2 | 2/2009 | Fernandes et al. | |
| 7,775,442 B2 * | 8/2010 | Saarisalo | 235/487 |
| 8,240,557 B2 | 8/2012 | Fernandes et al. | |
| 8,275,694 B2 * | 9/2012 | Tzroya | 705/37 |
| 8,523,053 B2 | 9/2013 | Royyuru et al. | |
| 8,596,528 B2 | 12/2013 | Fernandes et al. | |
| 2001/0034566 A1 | 10/2001 | Offer | |
| 2002/0062249 A1 | 5/2002 | Iannacci | |
| 2002/0128981 A1 | 9/2002 | Kawan et al. | |
| 2002/0175207 A1 | 11/2002 | Kashef et al. | |
| 2003/0055735 A1 | 3/2003 | Cameron et al. | |
| 2003/0169180 A1 | 9/2003 | Hardman | |
| 2003/0172028 A1 | 9/2003 | Abell et al. | |
| 2003/0229583 A1 | 12/2003 | Cotten et al. | |
| 2004/0068472 A1 | 4/2004 | Sahota et al. | |
| 2004/0159700 A1 | 8/2004 | Khan et al. | |
| 2004/0181453 A1 | 9/2004 | Ray et al. | |
| 2004/0249839 A1 | 12/2004 | Beenau et al. | |
| 2005/0004866 A1 | 1/2005 | Bonalle et al. | |
| 2005/0004921 A1 | 1/2005 | Beenau et al. | |
| 2005/0035192 A1 | 2/2005 | Bonalle et al. | |
| 2005/0059339 A1 | 3/2005 | Honda et al. | |
| 2005/0060062 A1 | 3/2005 | Walker et al. | |
| 2005/0128981 A1 | 6/2005 | Creamer et al. | |
| 2005/0171898 A1 | 8/2005 | Bishop et al. | |
| 2005/0192896 A1 | 9/2005 | Hutchison et al. | |
| 2005/0222961 A1 | 10/2005 | Staib et al. | |
| 2006/0000900 A1 | 1/2006 | Fernandes et al. | |
| 2006/0002610 A1 | 1/2006 | Suomela et al. | |
| 2007/0192245 A1 | 8/2007 | Fisher | |
| 2008/0011833 A1 | 1/2008 | Saarisalo | |
| 2008/0147508 A1 | 6/2008 | Liu et al. | |
| 2008/0167000 A1 | 7/2008 | Wentker et al. | |
| 2008/0167017 A1 | 7/2008 | Wentker et al. | |
| 2008/0207128 A1 | 8/2008 | Mikko | |
| 2008/0306849 A1 | 12/2008 | Johnson, Jr. et al. | |
| 2009/0075592 A1 | 3/2009 | Nystrom et al. | |
| 2009/0108064 A1 | 4/2009 | Fernandes et al. | |
| 2010/0051685 A1 | 3/2010 | Royyuru et al. | |
| 2010/0160714 A1 * | 6/2010 | Chua et al. | 600/25 |
| 2010/0325052 A1 | 12/2010 | Sahota et al. | |
| 2012/0011070 A1 | 1/2012 | Ward et al. | |
| 2012/0109764 A1 | 5/2012 | Martin et al. | |
| 2013/0015241 A1 | 1/2013 | Fernandes et al. | |
| 2013/0080273 A1 | 3/2013 | Royyuru | |

FOREIGN PATENT DOCUMENTS

| | | |
|---|---|---|
| EP | 1 104 909 A2 | 6/2001 |
| KR | 10-2007-0073718 | 7/2007 |
| KR | 10-2009-0029323 | 3/2009 |
| WO | WO 01/37199 A1 | 5/2001 |
| WO | WO 01/37200 A1 | 5/2001 |
| WO | WO 03/058947 A2 | 7/2003 |
| WO | WO 2010/011055 A2 | 1/2010 |

OTHER PUBLICATIONS

Notification of Transmittal of the International Search Report and the Written Opinion of the International Searching Authority, or the Declaration for International Application No. PCT/US2011/031293 (Oct. 24, 2011).
"Part III: Files, Commands, and Application Selection," EMV Integrated Circuit Card Specifications for Payment Systems, Book 1: Application Independent ICC to Terminal Interface Requirements, Version 4.2, pp. 119-150 (Jun. 2008).
"10. Data Management," EMV Integrated Circuit Card Specifications for Payment Systems, Book 4: Cardholder, Attendant, and Acquirer Interface Requirements, Version 4.2, pp. 81-94 (Jun 2008).
"Identification card—Integrated circuit cards—Part 4: Organization, security and commands for interchange," ISO/IEC 7816-4, Second Edition, pp. 1-90 (Jan. 15, 2005).
"Information technology—Telecommunications and information exchange between systems—Near Field Communications—Interface and Protocol (NFCIP-1)," ISO/IEC 18092, pp. 1-66 (Apr. 1, 2004).
"Identification cards—Contacless integrated circuit(s) cards—Proximity cards—Part 2: Radio frequency power and signal interface," ISO/IEC 14443-2, pp. 1-10 (Jul. 22, 2003).
"Information technology—Identification cards—Integrated circuit(s) cards with contacts—Part 5: Registration of application providers," ISO/IEC 7816-5.2, pp. 1-12 (Jan. 17, 2003).
"Information technology—Identification cards—Integrated circuit(s) cards with contacts—Part 4: Interindustry commands for interchange," ISO/IEC 7816-4, pp. 1-85 (Jan. 17, 2003).
"Identification cards—Contactless integrated circuit(s) cards—Proximity cards—Part 4: Transmission protocol," ISO/IEC 14443-4, pp. 1-39 (Mar. 10, 2000).
"Identification cards—Contactless integrated circuit(s) cards—Proximity cards—Part 3: Initialization and anticollision," ISO/IEC 14443-3, pp. 1-48 (Jun. 11, 1999).
"Identification cards—Integrated circuit(s) cards with contacts—Part 5: Numbering system and registration procedure for application identifiers," ISO/IEC 7816-5, Amendment 1, pp. 1-8 (Dec. 15, 1996).
"Identification cards—Integrated circuit(s) cards with contacts—Part 5: Numbering system and registration procedure for application identifiers," ISO/IEC 7816-5, First Edition, pp. 1-12 (Jun. 15, 1994).
Notice of Allowance and Fee(s) Due for U.S. Appl. No. 12/287,283 (Apr. 16, 2012).
Final Official Action for U.S. Appl. No. 10/428,502 (Feb. 8, 2012).
Notice of Allowance and Fee(s) Due for U.S. Appl. No. 12/287,283 (Jan. 10, 2012).

(56) References Cited

OTHER PUBLICATIONS

Notice of Allowance and Fee(s) Due for U.S. Appl. No. 12/287,283 (Nov. 23, 2011).
Non-Final Official Action for U.S. Appl. No. 12/287,283 (Mar. 1, 2011).
Non-Final Official Action for U.S. Appl. No. 10/428,502 (Jul. 19, 2010).
Decision on Appeal for U.S. Appl. No. 10/428,502 (Feb. 23, 2010).
Reply Brief Noted for U.S. Appl. No. 10/428,502 (Dec. 3, 2008).
Examiner's Answer for U.S. Appl. No. 10/428,502 (Aug. 25, 2008).
Notice of Allowance and Fee(s) Due for U.S. Appl. No. 11/137,682 (Jun. 30, 2008).
Notice of Panel Decision from Pre-Appeal Brief Review for U.S. Appl. No. 10/428,502 (May 14, 2008).
Final Official Action for U.S. Appl. No. 11/137,682 (Dec. 13, 2007).
Final Official Action for U.S. Appl. No. 10/428,502 (Nov. 28, 2007).
Non-Final Official Action for U.S. Appl. No. 10/428,502 (Apr. 16, 2007).
Non-Final Official Action for U.S. Appl. No. 11/137,682 (Mar. 20, 2007).
Final Official Action for U.S. Appl. No. 10/428,502 (Aug. 15, 2006).
Non-Final Official Action for U.S. Appl. No. 10/428,502 (Dec. 22, 2005).
Commonly-assigned, co-pending U.S. Appl. No. 10/428,502 for "Collaborative Negotiation Techniques for Mobile Personal Trusted Device Financial Transactions," (Unpublished, filed May 2, 2003).
"Identification cards—Contactless integrated circuit(s) cards—Vicinity cards—Part 3: Anticollision and transmission protocol," ISO/IEC 15693-3, First Edition, pp. 1-50 (Apr. 1, 2001).
"Identification cards—Recording technique—Part 2: Magnetic stripe—Low coercivity," ISO/IEC 7811-2, Third Edition, pp. 1-28 (Feb. 1, 2001).
"Identification cards—Contactless integrated circuit(s) cards—Vicinity cards—Part 1: Physical characteristics," ISO/IEC 15693-1, First Edition, pp. 1-12 (Jul. 15, 2000).
"Identification cards—Contactless integrated circuit(s) cards—Vicinity cards—Part 2: Air interface and initialization," ISO/IEC 15693-2, First Edition, pp. 1-19 (May 1, 2000).
Petri, "An Introduction to Smart Cards," Litronic, Inc., Messaging Magazine, pp. 1-12 (Sep./Oct. 1999).
Commonly-assigned, co-pending U.S. Appl. No. 13/584,553 for "Collaborative Negotiation Techniques for Mobile Personal Trusted Device Financial Transations," (Unpublished, filed Aug. 13, 2012).
Notice of Panel Decision from Pre-Appeal Brief Review for U.S. Appl. No. 11/137,682 (Apr. 25, 2008).
"Identification cards—Integrated circuit cards—Part 4: Organization, security and commands for interchange," ISO/IEC 7816-4, Second Edition, pp. 1-90 (Jan. 15, 2005).
Non-Final Office Action for U.S. Appl. No. 13/283,521 (Sep. 30, 2013).
Notice of Allowance and Fee(s) Due for U.S. Appl. No. 13/584,553 (Aug. 6, 2013).
Non-Final Office Action for U.S. Appl. No. 13/584,553 (Jan. 15, 2013).
Communication of European publication number and information on the application of Article 67(3) EPC for Application No. 11766608.1 (Jan. 16, 2013).
Communication of Extended European Search Report for European Patent Application No. 11766608.1 (May 21, 2014).

\* cited by examiner

SYSTEMS, METHODS, AND COMPUTER READABLE MEDIA FOR PERFORMING MULTIPLE TRANSACTIONS THROUGH A SINGLE NEAR FIELD COMMUNICATION (NFC) TAP

PRIORITY CLAIM

This application claims the benefit of U.S. Provisional Patent Application Ser. No. 61/321,110 filed on Apr. 5, 2010, the disclosure of which is incorporated herein by reference, in its entirety.

TECHNICAL FIELD

The subject matter described herein relates to systems and methods for performing multiple transactions through a single Near Field Communication (NFC) tap. More particularly, the subject matter described herein relates to systems and methods of performing multiple transactions identified and processed using a linkage mechanism communicated between an NFC device and a wireless NFC device reader using a single NFC tap.

BACKGROUND

Currently, various transactions in purchasing environments can be performed using wireless smart devices, for example near field communication (NFC) devices. Such transactions can include, without limitation, ordering goods and/or services, paying for goods and/or services, specifying personal preferences or personal data relating to goods and/or services, returning previously purchased goods and/or services, and redeeming coupons, customer loyalty points, promotions and/or combinations thereof. Such wireless transactions can occur at attended or unattended physical point of sale (POS) terminals. For example, a customer can perform several transactions at the POS terminal including ordering a sandwich with specific ingredients, redeeming a coupon, and paying for the sandwich. Conventional systems and methods which use an NFC device to complete these transactions require at least a two-step approach with a separate tap for each transaction. For example, the first step can include tapping the NFC device to the NFC wireless device reader to communicate value added applications including, for example, the order and/or coupon transactions. The second step can include tapping the NFC device to the NFC wireless reader for communicating the payment transaction. That is, more than one NFC tap is necessary to convey information for the order, coupon, and payment transactions in the sandwich example. This can be both cumbersome and time-consuming.

The time and ease of completing a transaction can be important factors many consumers consider when deciding where to purchase an item in today's retail environment. Merchants accommodating quick and easy retail transactions can be more competitive in selling their goods and/or services and may be more attractive to potential consumers. Therefore, it is desirable for quick and easy methods and systems of performing multiple transactions using NFC devices. Accordingly, there exists a need for methods and systems for performing multiple transactions through a single NFC tap.

SUMMARY

According to one aspect, the subject matter described herein includes a method of performing multiple transactions through a single near field communication (NFC) tap. The method includes storing, at a linking application in a wireless device, a plurality of application identifiers (AIDs) that identify a plurality of applications to be processed in a single NFC tap. The method can further include detecting, by a wireless device reader, a linking application AID in the wireless device that identifies the linking application upon interfacing the wireless device with the wireless device reader through the single NFC tap. The method can include accessing, by the wireless device reader, the plurality of AIDs using the linking application. The method can further include processing the plurality of applications associated with the plurality of AIDs through the single NFC tap.

As used herein, the term "wireless smart device" refers to a wireless device that can communicate via an electric and/or magnetic field between the device and some other entity, usually a wireless terminal or wireless smart device reader. One type of wireless device that can wirelessly communicate to a wireless smart device reader is an NFC card or NEC handheld device, including but not limited to a smart phone. In near field communication, a wireless smart device may communicate with a wireless smart device reader via inductive coupling of the reader antenna to the device antenna. The two loop antennas effectively form a transformer. The reader amplitude-modulates the radio frequency (RF) field to send information to the device. The device communicates with the reader by modulating the loading on the device antenna, which also modulates the load on the reader antenna. In a wireless smart device, the NEC handset enables contactless payment, and a security element (SE) for ensuring secure transactions can be embedded, provided by a universal subscriber identity module (USIM), or provided as an add-on to, for example, a SD or a jacket.

Wireless smart devices can communicate with a wireless device reader using NFC. As used herein, the term "wireless communications" includes communications conducted at ISO 14443 and ISO 18092 interfaces. These specifications define communication protocols for wireless smart devices operating in close proximity with a reader antenna. In one embodiment, wireless communications can communicate applications that are uniquely identified by an application identifier (AID), defined by the ISO/IEC 7816 specification. Application to terminal interface requirements are also defined in book 4 of the Europay MasterCard Visa (EMV) 4.2 specification.

The subject matter described herein may be implemented in software, in combination with hardware and/or firmware. For example, the subject matter described herein may be implemented in software executed by a processor. In one exemplary implementation, the subject matter described herein for performing multiple transactions through a single NEC tap may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
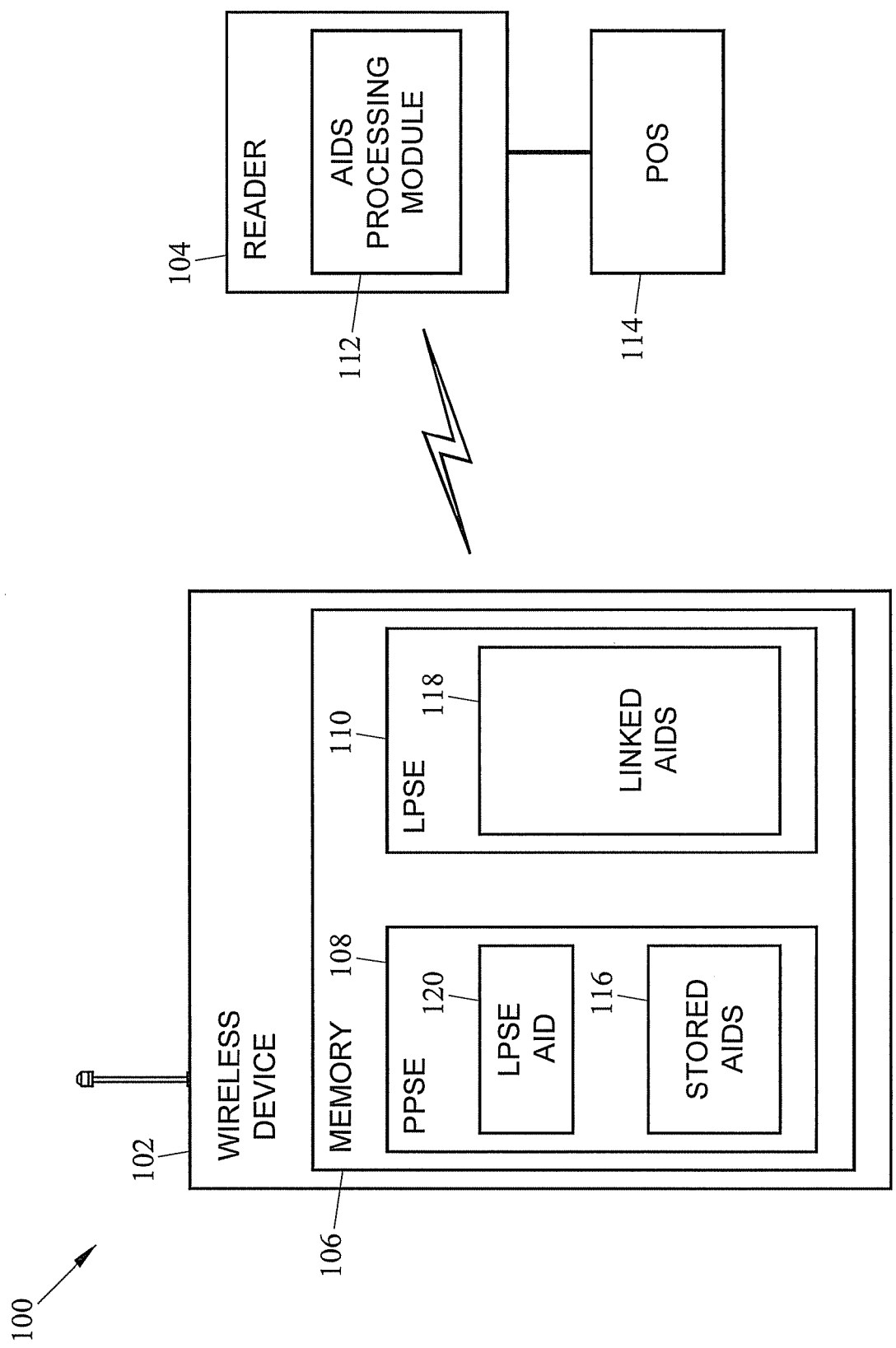
FIG. 1 is a block diagram illustrating an exemplary system facilitating multiple transactions through a single near field communication (NFC) tap according to an embodiment of the subject matter described herein.

In accordance with the subject matter disclosed herein, systems, methods, and computer readable media are provided for performing multiple transactions through a single near field communication (NFC) tap. Referring to FIG. 1, a system 100 generally designated for performing multiple transactions through a single NFC tap is illustrated. System 100 may include a wireless device 102 and a wireless device reader 104. Wireless device 102 and wireless device reader 104 can interface and communicate via respective loop antennas (not shown) activated by one or more contactless NFC taps of the device in proximity to the reader. In one embodiment, wireless device 102 includes at least one memory element 106 for storing a proximity payment system environment (PPSE) application 108 and a linked payment system environment (LPSE) application 110. LPSE application 110 includes a special application stored on the wireless device 102. In one embodiment, memory element 106 includes a Secure Element (SE) memory, where PPSE and LPSE applications 108 and 110 are accessible during a secure and authenticated session. However, PPSE and LPSE applications 108 and 110 do not require authentication and/or secure sessions. In one embodiment, memory element 106 may include a non-secure baseband memory of wireless device 102. One or more application identifiers (AIDs) can be stored in PPSE and LPSE applications 108 and 110 of a SE memory, a baseband memory linking through the SE memory, or in a baseband memory without any linking with the SE. Thus, as illustrated in FIG. 1, PPSE and LPSE applications 108 and 110 are illustrated as residing within memory element 106 of wireless device 102.

Wireless device 102 may include an NFC device such as an NFC smart card, an NFC mobile device such as an NFC phone, NFC tablet or a wireless smart card. Wireless device reader 104 may include any reader capable of reading a wireless smart card, an NFC enabled mobile device, or any other contactless payment type device. In one embodiment, wireless device reader 104 includes an AIDs processing module 112 used to process the one or more applications identified by one or more AIDs. The applications can be stored local to wireless device 102, for example, in an applet (not shown) or location separate from the PPSE and LPSE applications 108 and 110 accessible by wireless device reader 104. In one embodiment, AIDs processing module 112 may include a hardware based processing unit or processor chip. AIDs can correspond to a payment or non-payment application located on the device, which when accessed and processed at AIDs processing module 112 may complete a transaction in the retail environment. Such transactions may include but are not limited to ordering goods and/or services, paying for goods and/or services, specifying personal preferences or personal data relating to goods and/or services, returning previously purchased goods and/or services, and redeeming coupons, customer loyalty points, promotions and/or combinations thereof. Wireless device reader 104 may communicate wirelessly or otherwise with a merchant POS terminal 114. Wireless device reader 104 may communicate payment, transaction, and/or payload data to POS terminal 114 upon processing one or more applications identified using one or more AIDs.

Still referring to FIG. 1, wireless device 102 can include a plurality of stored AIDs 116. In one embodiment, stored AIDs 116 may be selected by a user and/or wireless device 102 using location data from a GPS module (not shown) disposed on the phone or using triangulation methods described further below. In another embodiment, stored AIDs 116 may be pre-programmed using firmware to be automatically populated within PPSE application 108, and may be stored in order of priority. In one embodiment, stored AIDs 116 include one AID stored according to priority. Notably, an LPSE AID 120 is stored in PPSE application 108 and is described further below. LPSE AID 120 can correspond to an LPSE application 110 having one or more linked AIDs 118 stored therein. Linked AIDs 118 can be linked and processed upon interfacing wireless device 102 with wireless device reader 104 via a single NFC tap. The plurality of AIDs 116 can be stored in directory format within PPSE application 108 and accessible by reader 104.

FIG. 1 further illustrates a linking application e.g., LPSE application 110 disposed in memory 106 of wireless device 102. LPSE application 110 can be accessed and processed by wireless device reader 104 when wireless device reader 104 receives LPSE AID 120. That is, LPSE AID 120 identifies and corresponds to LPSE application 110 making LPSE application 110 accessible to wireless device reader 104. One or more AIDs can be populated and stored in LPSE application 110. In one embodiment, linked AIDs 118 may become populated within LPSE application 110 using a wallet client (not shown) or firmware residing on wireless device 102 which inputs an AID into LPSE application 110 corresponding to an application selected by user selects of wireless device 102 which corresponds to the AID. LPSE application 110 may also become populated using the wallet client when wireless device 102 automatically selects AIDs using location data, for example, using a GPS module, a smart poster, or triangulation to identify the merchant location that the customer resides in, and can input AIDS into LPSE application 110 which correspond to that location. AIDs stored in LPSE application 110 may be linked upon interfacing wireless device 102 with wireless device reader 104, for example. As noted earlier, linked AIDs 118 may correspond to applications for payment and/or non-payment transactions optionally performed in a retail environment.

Notably, PPSE application 108 includes LPSE AID 120 corresponding to LPSE application 110. In one embodiment, PPSE application 108 may be pre-programmed to have LPSE AID 120 residing therein. PPSE application 108 may store LPSE AID 120 in addition to multiple stored AIDs 116. Upon receipt of LPSE AID 120 at wireless device reader 104, LPSE AID 120 may trigger reader 104 to detect and process LPSE application 110 wherein one or more of the selected AIDs have been configured into linked AIDs 118 via the single NEC tap. LPSE AID 120 may be detected by firmware or detection module (not shown) of wireless device reader 104. In one embodiment, LPSE AID 120 includes a special identifier which may be recognized by AIDs processing module 112 of wireless device reader 104. Where LPSE AID 120 is recognized, wireless reader 104 processes LPSE application 110 and the plurality of linked AIDs 118 in the order that they were selected or stored within LPSE application 110 via the single NFC tap. Notably, in instances where LPSE AID 120 is not identified by wireless device reader 104, the transaction will not fail but rather multiple taps will be needed to push one or more stored AIDS 116 of the PPSE application 108 to reader 104. Thus, systems and methods described herein may be used in systems where readers may or may not recognize LPSE AID 120. In one embodiment, AIDs are linked within LPSE application 110 using firmware residing on wireless device 102 when wireless device 102 interfaces with wireless device reader 104.

Stored AIDs 116, linked AIDs 118, and/or LPSE AID 120 may include a 16 byte data structure defined according to ISO/IEC 7816-4. The first five bytes of a given AID correspond to a registered identifier (RID) which uniquely identifies a specific payment or non-payment application provider. For example, the first five bytes can identify a payment application provided by VISA®, MasterCard®, American Express®, or any other suitable payment or non-payment merchant provider application, for example, a ViVOtech® application. An optional field within a given AID can be assigned by the application provider, or registrant, and can include up to 11 bytes of information. The information can include object or transaction data used in processing the payment or non-payment transaction application. This field is known as a Proprietary Application Identifier Extension (PIX) and may contain any 0-11 byte value specified by the provider. The PIX portion can typically define object data for one application to be processed at reader 104. The meaning of this field is defined only for the specific RID and need not be unique across different RIDs. In one embodiment, the RID and PIX portions of AIDs 116 and/or 118 are accessed by wireless device reader 104 upon interfacing wireless device 102 with reader 104. One or more AIDs 116 may be communicated in an order of pre-specified priority where wireless device reader 104 fails to recognize LPSE AID 120. Linked AIDs 118 may be accessed by reader 104 where LPSE AID 120 is recognized by reader 104. Multiple linked AIDs 118 residing in LPSE application 110 can be wirelessly accessed upon processing LPSE application 110 at wireless device reader 104 through the single NFC tap. As noted earlier, multiple linked AIDs 118 can correspond to applications for one or more transactions that may become linked and/or processed through a single NFC tap as disclosed herein.

A plurality of AIDs may become populated within LPSE application 110 based upon user selection or device selection using a wallet client application in the wireless device 102. In one embodiment, the wallet client application may comprise a software application (which may be executed by a processing unit in a mobile device) that manages multiple softcards stored on the mobile device. These electronic-based softcards may include electronic credit cards, debit cards, prepaid cards, electronic coupons, electronic tickets, gift cards, loyalty cards, and the like. The wallet client may also be responsible for populating AIDs in LPSE 110. For example, the wallet client may receive WiFi triangulation and/or GPS location information from an external source. The wallet client may also receive location information after interfacing with (e.g., tapping) a smart poster at a store location. Using the location information, the wallet client may then populate LPSE 110 with AIDs associated with the specified location associated with the location information (e.g., a Macy's credit card, a Macy's loyalty card, and applicable electronic coupon may be provisioned in LPSE 110 when the received location data indicates a Macy's store location).

Upon selection, AIDs may be subsequently linked within LPSE application 110 thereby forming linked aids 118. Linked AIDs 118 may correspond to payment transactions including but not limited to applications supported by Visa® or MasterCard®. Non-payment transactions may include, without limitation, applications for loyalty cards, loyalty points, coupons, ordering information, promotions, personal preferences, personalized data, product return information and/or any other suitable application or combinations thereof used to conduct a payment or non-payment transaction at POS terminal 114. In one embodiment, AIDs 118 may be dynamically selected by a user or wireless device 102 in the purchasing environment.

As noted above, in one embodiment, AIDs can become populated in LPSE application 110 based upon a user selecting an application. As used herein, the term "selecting" an application refers to the process by which a user or wireless device 102 activates, indicates, populates, or identifies one or more applications to be stored LPSE application and 110 for processing payment or non-payment transactions in system 100. In another embodiment, AIDs may become selected and stored in LPSE application 110 where wireless device wireless device 102 selects AIDs based upon information, for example, location information as described below. Linking the plurality of selected AIDS 116 thereby establishes a directory of linked AIDs 118 within LPSE application 110. Upon interfacing via the single wireless NFC tap, wireless device reader 104 can access and process either PPSE application 108 or LPSE application 110. When reader processes LPSE application 110 a plurality of linked AIDs 118 can be processed through the single NEC tap. When accessing PPSE application 108, stored AIDs 116 may be processed according to a preset priority using multiple NFC taps.

Wireless device 102 may also select AIDs associated with application data, and store the selected AIDs in LPSE application 110. Wireless device 102 may select and populate LPSE application 110 with AIDs using various types of information local to or received at wireless device 102. For example, wireless device 102 can include a geographic location module (not shown) which can determine location information associated with wireless device 102, and can dynamically select one or more AIDs 118 for linking in LPSE application 110 based on the location information. For example, wireless device may determine, using the geographic location module, that the device is located in or near a Macy's® department store. Wireless device 102 can then automatically "push" and link AIDs in LPSE application 110 which correspond to payment and/or non-payment transaction applications according to the location information. For example, one or more Macy's® coupons can become automatically selected by wireless device 102. Payment using a Macy's® credit card can also become automatically selected. The respective coupon and payment AIDs can be selected and stored in LPSE application 110 and subsequently received at the wireless device reader 104 upon the single tap. Multiple applications can be prioritized according to the order in which wireless device 102 selected AIDs 118 associated with a respective transaction application. A user has the option of deselecting any AIDs automatically selected by wireless device 102.

In one embodiment, AIDs 118 may be automatically selected and populated in LPSE application 110 using, for example, firmware or a wallet client where a user of wireless device 102 manually interfaces the wireless device 102 with a smart poster or reader 104 upon entry into a merchant location. For example, the user of wireless device 102 could manually interface with a Macy's® smart poster upon entering the store. One or more AIDs corresponding to Macy's® applications, for example, coupon or payment transaction applications could automatically be inserted into LPSE application 110. In one embodiment, wireless device 102 may know the merchant location using GPS tracking on the customer entering the merchant location, and can automatically select one or more AIDs to insert into LPSE application 110 based upon that location, such as selecting AIDs corresponding to a Macy's® card or coupon described above. In one embodiment, wireless device 102 can use a triangulation signal such that it knows when a customer enters a merchant location. For example, upon arriving at a given merchant location, a particular application may be triggered and the corresponding AID automatically selected into LPSE application 110. The application and corresponding AID may be triggered by a WiFi signal, a GPS signal, or a triangulation signal that is transmitted by the store entity and is received by wireless device 102 upon entering the store location or being within proximity of a certain distance of the entrance of the store.

According to methods and systems described herein, AIDs populated within of LPSE application 110 may become linked within the linking application, e.g., LPSE application 110 such that linked AIDs 118 can be processed via the single NFC tap. Wireless device reader 104 can wirelessly access and process linked AIDs 118 residing in LPSE application 110 using AIDs processing module 112. Such processing completes transaction applications corresponding to linked AIDs 118 and generates payload data associated with the transaction applications. Payload data generated by processing the payment or non-payment transactions may then be forwarded to POS terminal 114. The forwarded payload data can be communicated, wirelessly or otherwise to POS terminal 114 for completion of the transaction.

Upon interfacing wireless device 102 with wireless device reader 104, LPSE AID 120 may indicate to wireless device reader 104 that more than one transaction, or a combination of transactions may be conducted. In one embodiment, LPSE application 110 includes a merchant or consumer application designed to facilitate communication of multiple transactions in a single NFC tap. For example, LPSE application 110 can include an application defined and registered by ViVOtech, Inc. of Santa Clara, Calif. AIDs residing in LPSE application 110 may become linked during interfacing wireless device 102 with wireless device reader 104 according to an order in which the AIDs were selected. LPSE application 110 is then processed at AIDs processing module 112 of wireless device reader 104. The one or more linked AIDs 118 may then be processed in the specified order that they were linked, i.e., the order the AIDs were selected by a user or wireless device 102. Thus, LPSE AID 120 may inform wireless device reader 104 of the number of transactions to be processed through the single tap, the order and type of transactions to be processed, to link the AIDs 118, and any other necessary information.

Figure 2:
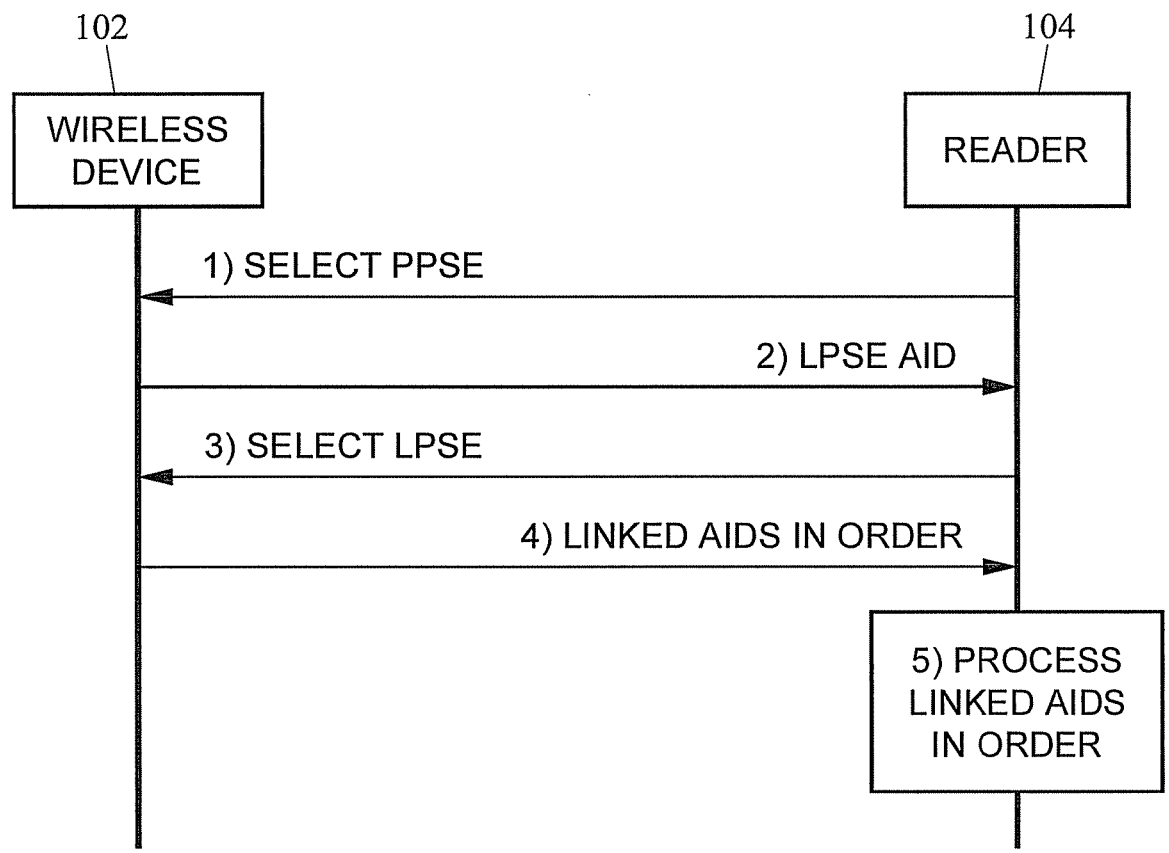
FIG. 2 is a message flow diagram illustrating an exemplary embodiment of messaging between a wireless device and a wireless device reader for facilitating multiple transactions through a single NFC tap according to an embodiment of the subject matter described herein.

FIG. 2 is a messaging diagram illustrating an exemplary process for performing multiple transactions through a single NFC tap using systems described herein. FIG. 2 illustrates messaging commenced during interfacing wireless device 102 with wireless device reader 104 through the single tap. Prior to step 1, one or more applications have previously been selected such that AIDs associated with the one or more selected applications thereby reside in LPSE application 110. LPSE AID 120 resides in PPSE application 108. Stored AIDs 116 residing in PPSE application 108 are pre-programmed or pre-selected by a user and are in an order of priority. In one embodiment, LPSE AID 120 is of the highest priority within PPSE application 108. In one embodiment, a user of wireless device 102 has identified and selected which transactions to perform thereby storing corresponding AIDs 116 in PPSE application 108 and linked AIDs 118 in LPSE application 110 prior to the single tap. The user can select one or more applications through a communications interface for communicating with a graphic user interface (GUI) or other user interface (UI) on the device. Upon selection, for example, using a touch screen or keypad of the wireless device 102, a user may select an application whereby AIDs associated with selected application is stored in LPSE application 110. AIDs may become linked within LPSE application 110 using firmware residing on wireless device 102 such that upon interfacing wireless device 102 with wireless device reader 104, the AIDs become configured into linked AIDs 118. In one example, wireless device 102 may display a list of applications stored in the device 102 using a display screen (not shown). The list may include applications for completing various payment or non-payment transactions. For example, the user may be presented with a merchant application and can select an order for a hamburger cooked to a specific temperature with lettuce, tomato, and mayonnaise. The user may also be presented with a merchant application allowing redemption of one or more coupons which can be applied to the hamburger order. The user can also select a payment application for completing the payment transaction for the hamburger, for example, a VISA® card. AIDs associated with each of the respective order, coupon, and payment transaction applications can then be selected and stored in LPSE application 110 according to the priority in which the given AID was selected.

In step 1 of FIG. 2, wireless device reader 104 transmits a "SELECT PPSE" message for access to PPSE application 108 having stored AIDs 116 residing therein. The "SELECT PPSE" command may include a default command recognized by device 102. Upon receipt of the "SELECT PPSE" command, at step 2, wireless device reader 104 receives LPSE AID 120 residing in PPSE application 108. LPSE AID 120 indicates to reader 104 that multiple applications corresponding to multiple transactions will be communicated in the single NFC tap. In one embodiment, LPSE AID 120 can further indicate to the reader the expected number of transactions, the priority of the transactions, and any security information.

At step 3 in the messaging flow diagram of FIG. 2, reader 104 sends a "SELECT LPSE" command in recognition of LPSE AID 120. The "SELECT LPSE" command may initiate processing of LPSE application 110 at reader 104, and subsequently allow the reader 104 to access a plurality of linked AIDs 118 residing in LPSE application 110. At step 4, upon receipt of the "SELECT LPSE" command, wireless device 102 may communicate, or "push" a plurality of linked AIDs 118 in the order that they were selected and stored in LPSE application 110 to reader 104. In one embodiment, linked AIDs 118 may be previously selected by the user and/or wireless device 102. Linked AIDs 118 may be accessed upon processing LPSE application 110 at AIDs processing module 112. Linked AIDs 118 may be subsequently processed at AIDs processing module 112 of wireless device reader 104 according to the order specified by the user and/or wireless device 102. Returning to the previous hamburger example above, linked AIDs 118 associated with each of the specified order, coupon, and VISA® transaction applications can each be received at wireless device reader 104 and processed in that specific order as indicated by step 5 of FIG. 2. LPSE AID 120 essentially triggers wireless device reader 104 to process LPSE application 110 to access multiple linked AIDs 118. Upon receiving LPSE AID 120, wireless device reader 104 is notified and expects to receive and process multiple linked AIDs 118 associated with multiple payment or non-payment transaction applications through the single NFC tap.

If wireless device reader 104 does not recognize LPSE AID 120, notably, the interaction will not fail. Rather, multiple NFC taps will be necessary for the reader to receive one or more stored AIDs 116 residing in PPSE application 108. For example, returning to the hamburger example, the AID for the order would be communicated first in the single tap, and subsequent taps would be necessary to communicate AIDs associated with the coupon and VISA® payment transaction applications. LPSE AID 120 will thereby become ignored by wireless device reader 104. This feature may be advantageous, as systems using LPSE AID 120 and associated LPSE application 110 can still operate in current systems.

Figure 3:
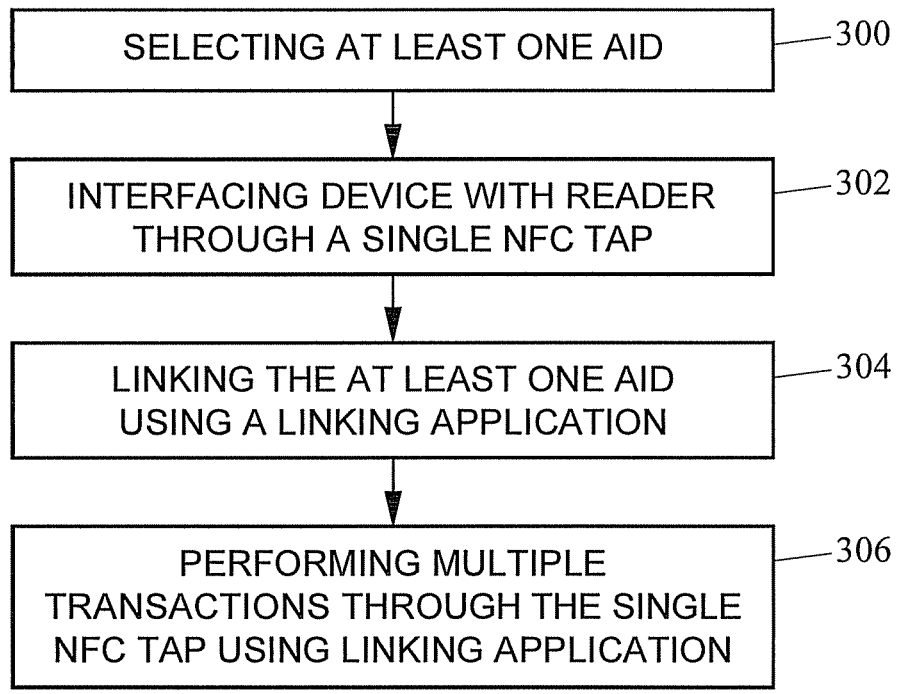
FIG. 3 is a flow chart illustrating an exemplary process for facilitating multiple transactions through a single NFC tap according to an embodiment of the subject matter described herein.

FIG. 3 is a flow chart illustrating an exemplary process for facilitating multiple transactions through a single NFC tap. Block 300 of FIG. 3 includes selecting at least one AID. AIDs can be selected, i.e., populated and stored such that the AIDs reside in LPSE application 110 by the wireless device 102 or a user of wireless device 102. LPSE application 110 may also link selected AIDs upon interfacing wireless device 102 with wireless device reader 104. In one embodiment, block 300 includes storing, at a linking application in a wireless device, a plurality of application identifiers (AIDs) that identify a plurality of applications to be processed in a single NFC tap.

At block 302, wireless device 102 and wireless device reader 104 interface through a single NFC tap. Upon interfacing, wireless device reader 104 communicates the "SELECT PPSE" command to wireless device 102. LPSE AID 120 residing in PPSE application 110 can be communicated from device 102 to reader 104. LPSE application 110 can be accessed and processed by reader 104 using LPSE AID 120. The plurality of AIDs populated in LPSE application 110 can become linked at block 304, and essentially become "pushed' from wireless device 102 to wireless device reader 104 using LPSE application 110. In one embodiment, block 302 can include detecting, by a wireless device reader, a linking application AID in the wireless device that identifies the linking application upon interfacing the wireless device with the wireless device reader through the single NFC tap. This step can include accessing, by the wireless device reader, the plurality of AIDs using the linking application.

At block 304 the AIDs populated within linking application, e.g., LPSE application 110 become linked. In one embodiment, AIDs may become linked within LPSE application 110 using firmware residing on wireless device 102 such that upon interfacing wireless device 102 with wireless device reader 104. AIDs may become automatically linked in LPSE application 110 in the order that they were selected. In one aspect, linked AIDs 118 are linked based upon the order in which they were selected to reside in LPSE application 110.

Block 306 of FIG. 3 includes performing multiple transactions through the single NFC tap using the linking application, e.g., LPSE application 110. Multiple transactions can be performed by processing LPSE application 110 having one or more linked AIDs 118 residing therein. Linked AIDs 118 may correspond to multiple applications that upon processing complete multiple payment or non-payment transactions. Linked AIDs 118 may be processed via the single tap in the specific priority according to the order in which the AIDs were selected. Payload data generated upon processing the linked AIDs can then be communicated to POS terminal 114. Thus, in one embodiment, block 306 includes processing the plurality of applications associated with the plurality of AIDs through the single NFC tap. This allows payload data for each transaction to be packaged together in one packet for the POS terminal 114. Processing and packaging multiple transactions via a single NFC tap may advantageously reduce the time to complete a transaction and may improve the ease at which transactions can be conducted in retail environments.

In addition to applications which use previously described AIDs 116 and 118 stored on a wireless device 102, contactless applications on contactless smart cards according to MIFARE® specifications can also be supported. For example, a special AID which provides MIFARE® based information can be created. MIFARE® is a standard that defines protocols and memory storage format for applications on wireless smart devices. The MIFARE® standard can support a wide range of applications such as contactless payment, loyalty, public transportation, ticketing, coupon, access control, and gaming. The MIFARE® standard conforms to some, but not all, of the ISO 14443 specification. In one embodiment, wireless device 102 may respond to a "Select PPSE" command issued sending a special AID similar to the LPSE AID 120. The special AID can indicate the number of transactions, the order in which to process the transactions, the sector-bit map information, respective security keys. Each of the figures previously described are applicable to contactless applications on contactless smart cards according to MIFARE® specifications.

For MIFARE® applications, the special AID can be registered by a merchant application and associated with wireless device 102. The special AID can be recognized by wireless device reader 104, and reader can be informed that multiple transactions will be performed using a single NFC tap. The special AID includes a multiple-message header transaction linked tap that is MIFARE® based. The header may include the number of transactions, the priority, or order of transactions, and the sector-bit map information.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for performing multiple transactions through a single near field communication (NFC) tap, the system comprising:
   a wireless device including a linking application that stores a plurality of application identifiers (AIDs) that identify a plurality of applications to be processed in a single NFC tap and a proximity payment system environment (PPSE) application that stores a linking application identifier associated with the linking application; and
   a wireless device reader, upon being interfaced with the wireless device via the single NFC tap, for detecting the linking application identifier stored in the PPSE application in the wireless device via the single NFC tap, for utilizing the linking application identifier to access the linking application in the wireless device via the single NFC tap, for accessing the plurality of AIDS using the linking application via the single NFC tap, and for processing the plurality of applications associated with the plurality of AIDs included in the linking application, wherein each of the plurality of applications is processed as one of a plurality of transactions performed through the single NFC tap.

2. The system according to claim 1, wherein the wireless device includes at least one of an NFC card, an NFC handset, an NFC tablet, or a contactless smart card.

3. The system of claim 1, wherein the linking application comprises a linked payment system environment (LPSE) application.

4. The system according to claim 3, wherein the plurality of AIDs is stored in the LPSE application using a graphical user interface of the wireless device.

5. The system according to claim 3, wherein the plurality of AIDs is stored in the LPSE application by the wireless device using location data.

6. The system according to claim 5, wherein the location data identifies a merchant location using GPS data, a smart poster, or triangulation data.

7. The system according to claim 1, wherein the linking application comprises a linked payment system environment (LPSE) application adapted to link the plurality of AIDs and communicate information to the wireless device reader regarding the linked plurality of AIDs upon interfacing the wireless device with the wireless device reader via the single NFC tap.

8. The system according to claim 7, wherein the LPSE application pushes the plurality of linked AIDs corresponding to a plurality of transaction applications to the wireless device reader.

9. The system according to claim 7, wherein the LPSE application communicates a specific order in which to process the linked AIDs to the wireless device reader.

10. A method of performing multiple transactions through a single near field communication (NFC) tap, the method comprising:
storing, at a linking application in a wireless device, a plurality of application identifiers (AIDs) that identify a plurality of applications to be processed in a single NFC tap;
storing, at a proximity payment system environment (PPSE) application in the wireless device, a linking application identifier associated with the linking application;
detecting, by a wireless device reader, the linking application identifier stored in the PPSE application in the wireless device upon interfacing the wireless device with the wireless device reader through the single NFC tap;
utilizing the linking application identifier to access the linking application in the wireless device via the single NFC tap;
accessing, by the wireless device reader, the plurality of AIDs using the linking application via the single NFC tap; and
processing the plurality of applications associated with the plurality of AIDs included in the linking application, wherein each of the plurality of applications is processed as one of a plurality of transactions performed through the single NFC tap.

11. The method according to claim 10, wherein storing the plurality of AIDs comprises storing the plurality of AIDs, at a linking application in at least one of an NFC card, an NFC handset, an NFC tablet, or a contactless smart card.

12. The method of claim 10, wherein the linking application comprises a linked payment system environment (LPSE) application.

13. The method according to claim 12, wherein storing the plurality of AIDS in the LPSE application comprises selecting the plurality of AIDs using a graphical user interface of the wireless device.

14. The method according to claim 12, wherein storing the plurality of AIDS in the LPSE application comprises selecting the plurality of AIDs, by the wireless device, using location data.

15. The method according to claim 10, further comprising communicating information to the wireless device reader regarding the plurality of AIDs using the linking application.

16. The method according to claim 15, wherein communicating information to the wireless device reader comprises communicating an expected number of transactions to the wireless device reader.

17. The method according to claim 15, wherein communicating information to the wireless device reader comprises communicating a specific order in which to process the linked AIDs to the wireless device reader.

18. The method of claim 10, further comprising packaging all payloads in one packet for a point of sale (POS) terminal.

19. A non-transitory computer readable medium having stored thereon comprising computer executable instructions that when executed by a processor of a computer performs steps comprising:
storing, at a linking application in a wireless device, a plurality of application identifiers (AIDs) that identify a plurality of applications to be processed in a single NFC tap;
storing, at a proximity payment system environment (PPSE) application in the wireless device, a linking application identifier associated with the linking application;
detecting, by a wireless device reader, the linking application identifier stored in the PPSE application in the wireless device upon interfacing the wireless device with the wireless device reader through the single NFC tap;
utilizing the linking application identifier to access the linking application in the wireless device via the single NFC tap;
accessing, by the wireless device reader, the plurality of AIDs using the linking application via the single NFC tap; and
processing the plurality of applications associated with the plurality of AIDs included in the linking application, wherein each of the plurality of applications is processed as one of a plurality of transactions performed through the single NFC tap.

* * * * *